E. S. BERGLUND.
METHOD OF AND APPARATUS FOR OBTAINING ZINC.
APPLICATION FILED SEPT. 15, 1914.
1,207,127.
Patented Dec. 5, 1916.
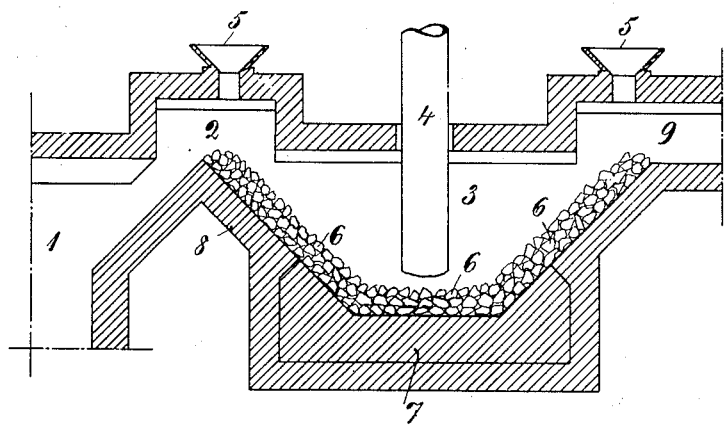
Witnesses:
M. J. Whittaker
E. B. Anderson
Inventor:
Edward Salomon Berglund,
per
Hazeltine, Lake & Co.
Attorneys.

UNITED STATES PATENT OFFICE.

EDWARD S. BERGLUND, OF TROLLHÄTTAN, SWEDEN, ASSIGNOR TO TROLLHÄTTANS ELEKTROTHERMISKA AKTIEBOLAG, OF TROLLHÄTTAN, SWEDEN.

METHOD OF AND APPARATUS FOR OBTAINING ZINC.

1,207,127.     Specification of Letters Patent.     Patented Dec. 5, 1916.

Application filed September 15, 1914. Serial No. 861,758.

*To all whom it may concern:*

Be it known that I, EDWARD SALOMON BERGLUND, a subject of the King of Sweden, residing at Trollhättan, in the Kingdom of Sweden, have invented certain new and useful Improvements in the Methods of and Apparatus for Obtaining Zinc. of which the following is a specification.

The present invention refers to a method of purifying zinc gases, produced from ore or any other zinc containing material in an electric furnace.

The invention has for its object to reduce the carbon dioxid and other oxidizing gases mixed with the exhausting zinc gases, and also to mechanically purify said gases before entering the condenser from powder of the charge, carried along by the gases, in order to facilitate the condensation of the zinc gases.

It has already been proposed by many metallurgists to effect the purifying and reduction of the gases by conducting them through a layer of incandescent coke. When carrying this method into practice very great inconvenience is met in view of the fact, that the layer of coke is very quickly obstructed by the slag of the ashes of the coke and by dust from the ore and zinc, and for this reason this method has been shown to be very difficult, if not impossible to carry out.

According to the present invention a dust receiving and reduction chamber is arranged between the furnace and the condenser, which chamber is only partly filled with carbon or another reducing material, over which carbon layer the gases are conducted. This chamber affords a free area of passage for the gases and its size is such that the velocity of the passing gases is decreased to a sufficient extent to give the powder of ore and carbon carried along from the furnace ample time to settle, while the carbon dioxid will have time to become reduced, before the gases enter the condenser. As the same advantage is thus gained as by conducting the gases through a layer of carbon, while the disadvantages of that method are avoided, the present invention comprises an improvement of considerable value.

The accompanying drawing illustrates in longitudinal section a construction, adapted to be used when carrying out the present invention.

1 indicates part of an electric furnace, in which the smelting is carried out. The furnace chamber 1 communicates with a powder receiving and reduction chamber 3 through the chamber 2, which chamber 3 may be heated through the electrode 4. The coke or carbon may be introduced into the chamber 3 through openings 5, through other openings in the roof of the chamber, by means of conveyers in the walls of the chamber or in any other convenient manner, so that a layer of carbon 6 is arranged on the bottom of the chamber 3. The bottom 7 of the chamber may be covered wtih carbon, which in such case serves to introduce the electric current. Any slag collected, may be discharged from the bottom of the chamber.

Reference 9 indicates the exhaust to the condenser.

The chamber 3 has such dimensions, that the area, which is offered to the passing gases, is large enough to diminish the velocity of the gases, entering through the channel 2 and exhausting through the channel 9, to such an extent, that the ore dust and carbon dust have time to settle before the gases exhaust to the condenser through the channel 9. The free area of the chamber 3 is therefore made considerably larger than the sectional area of the channels 2 and 9. During their slow travel through the chamber 3, oxidizing gases, such as carbonic acid, will thus have time to be reduced to carbon monoxide when in contact with the glowing coke layer 6.

By eliminating dust and oxidizing gases from the furnace gases in the manner above described, they will be condensed in the condenser much more easily, since the presence of these impurities is the reason for the generation of zinc dust which is very difficult to convert into liquid zinc.

What I claim and desire to secure by Letters Patent of the United States is:—

1. In extracting zinc in an electric furnace the method of reducing and purifying the metallic vapors developed in the furnace, consisting in passing said vapors after leaving the furnace and on their way to the condenser, over a layer of reducing material, without passing them through such material and heating them above the condensing temperature.

2. In extracting zinc in an electric furnace the method of reducing and purifying the metallic vapors, consisting in passing said vapors, after leaving the furnace and on their way to the condenser, over a layer of reducing material, without condensing them by such material.

3. In extracting zinc in an electric furnace the method of reducing and purifying the metallic vapors, consisting in passing said vapors, after leaving the furnace and on their way to the condenser, over a layer of reducing material, without passing them through such material, and heating them above the condensing temperature, while diminishing the velocity of their passage over said layer.

4. In extracting zinc in an electric furnace the method of reducing and purifying the metallic vapors, consisting in passing said vapors, after leaving the furnace and on their way to the condenser, over a layer of reducing material, without passing them through such material, and heating them above the condensing temperature while precipitating solid particles carried by said vapors.

5. In an electric furnace for extracting zinc the combination of a furnace chamber, gas channels, a condenser communicating with said furnace chamber, a chamber placed between the furnace chamber and the condenser, said chamber having larger sectional area than the gas channels, a layer of carbon on the bottom wall of said chamber, and means for heating said carbon.

6. In an electric furnace for extracting zinc the combination of a furnace chamber, a condenser communicating with said furnace chamber, a chamber placed between the furnace chamber and the condenser, said chamber having a bottom wall comprising a downwardly extending section, a substantially horizontal section and an upwardly inclined section, a thin layer of carbon spread over the whole length of said bottom wall and means for heating said layer of carbon.

In testimony whereof I affix my signature in presence of two witnesses.

EDW. S. BERGLUND.

Witnesses:
BEMH OUSELL,
VERNER SVANTESON.